W. S. LAWRENCE.
Animal-Traps.
No. 135,134.  Patented Jan. 21, 1873.
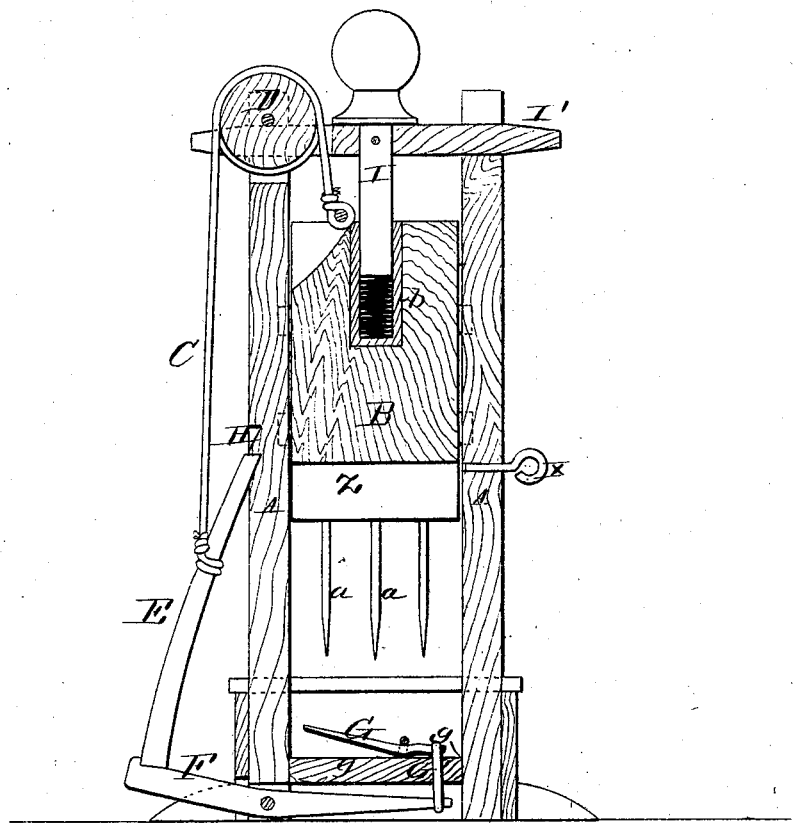
Witnesses
E. N. Bates
T. A. Connolly
Inventor
William S. Lawrence,
Chipman Hosmer & Co.
Attys.

UNITED STATES PATENT OFFICE.

WILLIAM S. LAWRENCE, OF WINCHESTER, KENTUCKY.

IMPROVEMENT IN ANIMAL-TRAPS.

Specification forming part of Letters Patent No. 135,134, dated January 21, 1873.

*To all whom it may concern:*

Be it known that I, WILLIAM S. LAWRENCE, of Winchester, in the county of Clark and State of Kentucky, have invented a new and valuable Improvement in Animal-Traps; and I do hereby declare that the following is a full, clear, and exact description of the construction and operation of the same, reference being had to the annexed drawing making a part of this specification, and to the letters and figures of reference marked thereon.

The figure of the drawing is a representation of a sectional view of my invention.

This invention has relation to animal-traps designed principally for the destruction of moles; and it consists in the construction and novel arrangement of the devices, as hereinafter described.

In the drawing, A designates two upright posts of a trap-frame; B, a grooved "dead-fall," having a spring, $b$, inserted in a recess in its upper end, and having a number of pointed rods or spears, $a$, projecting from its lower end. C is a cord attached to said "dead-fall," and thence carried upward and over a pulley, D. E represents a bar hung upon one end of said cord; F, a notched lever, pivoted to the bottom of the trap-frame, and arranged transversely, as shown. G designates a bait hook or lever, pivoted to a bar, $g$; G', a rod, attached to the inner end of the lever F, and extending upward through the bar $g$. A hook is formed on the upper end of said rod, and underneath said hook the short end of the lever G is put in setting the trap. H designates notches in one of the posts A; I, a pin, depending from the cross-beam I'.

In setting the trap, the "dead-fall" is raised a sufficient height, the bait-lever set, as above explained, and the bar E placed with its upper end in one of the notches H, and its lower end in the notched part of the lever F. The spring $b$ is thus compressed by the pin I. Now, as soon as the bait-lever, holding suitable bait, is moved, the lever F is tripped and the bar E released. The "dead-fall" then descends, its force being increased by the spring $b$, and pierces the animal through the body, killing it instantly.

In the bottom of the "dead-fall" a recess, Z, is formed, which embraces the bar $g$ when the former falls.

In setting, the "dead-fall" is held up by means of a pin, $x$, passed through a hole in one of the posts A, and underneath the "dead-fall."

What I claim as my invention, and desire to secure by Letters Patent, is—

The spring $b$, in combination with the "dead-fall" B and pin I, substantially as and for the purpose specified.

In testimony that I claim the above I have hereunto subscribed my name in the presence of two witnesses.

WM. S. LAWRENCE.

Witnesses:
W. M. BECHNER,
T. F. PHILLIPS.